UNITED STATES PATENT OFFICE 2,374,078

VINYL COMPOUNDS AND POLYMERS THEREFROM

Donald Drake Coffman, Wilmington, Del., assignor to E. I. du Pont de Nemours & Company, Wilmington, Del., a corporation of Delaware No Drawing. Application November 18, 1940, Serial No. 366,188

1 Claim. (Cl. 260—86)

This invention relates to new compositions of matter and more particularly to divinyl acetals and to polymeric products obtained therefrom.

The acetals, among other methods, have been prepared by the reaction of suitable aldehydes with monohydric alcohols. The divinyl acetals of the present invention have, however, previously been unknown and are not adapted to the above mentioned method of preparation.

This invention has as an object the preparation of divinyl acetals. A further object is the production of polymers of divinyl acetal and of copolymers obtained by interpolymerization of divinyl acetal with other unsaturated polymerizable compounds. A still further object consists in methods for obtaining these products. Other objects will appear hereinafter.

The above objects are accomplished by the production of divinyl acetals through the dehydrohalogenation of di(2-haloethyl) acetals.

The divinyl acetals of this invention are of the general formula

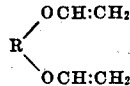

in which R is a divalent organic radical and in which the oxygen atoms are attached to the same carbon atom in R. These compounds are to be distinguished both in composition and method of preparation from those which are obtained by reaction of polyvinyl alcohol with aldehydes. The polyvinyl alcohol-aldehyde reaction products are polymers having the composition

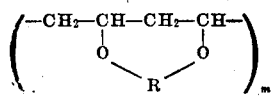

The compounds of this invention, as above indicated, have the formula $R(OCH=CH_2)_2$ and are obtained by the dehydrohalogenation of di(2-haloethyl) acetals. Thus di(2-chloroethyl) formal $CH_2(OCH_2CH_2Cl)_2$ yields, by elimination of hydrogen chloride, divinyl formal $$CH_2(OCH:CH_2)_2$$

The di(2-haloethyl) acetals can be obtained by methods known to the literature. A convenient method for their preparation is illustrated by the synthesis of di(2-chloroethyl) formal obtained by heating a mixture of paraformaldehyde, ethylene chlorohydrin, and powdered freshly ignited calcium chloride. Acetals from higher molecular weight aldehydes can be prepared in a similar manner.

The preparation of suitable di(2-haloethyl) acetals from which the present divinyl acetals are obtained is given below.

Di(2-bromoethyl) formal is prepared in the following manner. A mixture of paraformaldehyde (60 parts), powdered freshly ignited calcium chloride (60 parts), and ethylene bromohydrin (500 parts) is heated in a one-liter flask overnight on a steam bath. The formal so formed is separated from the lower aqueous layer, washed several times with water, dried over magnesium sulfate, and distilled. There is obtained 445 parts or an 85% yield of di(2-bromoethyl) formal, boiling at 103–108° C. under 6.5 mm.

Di(2-chloroethyl) formal is prepared in a similar manner.

Di(2-chloroethyl) butyral is obtained by the following procedure:

Into a solution of 29 parts of dry hydrogen chloride in 1610 parts of ethylene chlorohydrin contained in a 3-opening reactor vessel equipped with a mechanical stirrer, dropping funnel, condenser, and cooled by an external salt-ice bath, is added 728 parts of freshly distilled n-butyraldehyde sufficiently slowly to keep the temperature of the mixture below 10° C. The clear solution is allowed to stand for 60 hours, freed of acid by addition of solid sodium bicarbonate, and is then dried over anhydrous magnesium sulfate. Distillation gives (1) a foreshot consisting of ethylene chlorohydrin and n-butyraldehyde, (2) 514 parts of di(2-chloroethyl) butyral boiling at 119.8–121° C. under 10 mm., and (3) 130 parts of an unidentified fraction boiling at 153–154° C. under 12 mm.

The formation of the divinyl acetals by dehydrohalogenation of di(2-haloethyl) acetals is conveniently effected by the gradual addition of the halogen-containing acetal to fused, powdered potassium hydroxide heated to temperatures ranging from 170° C. to 300° C. The reaction is preferably carried out with good agitation and in an atmosphere of nitrogen to reduce the formation of by-products and prevent discoloration of the product. The divinyl acetal distills from the reaction mixture and is collected along with the water formed. The organic distillate is separated from the water layer, dried, and fractionated. As the molecular weight of the aldehyde used to synthesize the di(2-haloethyl) acetal is increased, the ease of dehydrohalogenation decreases somewhat and the higher temperatures are desirable for effecting complete reaction. For example, a temperature of 220° to 300° C. is desirable for the dehydrochlorination of di(2- chloroethyl) butyral. In the case of the higher acetals it is usually preferable to carry out the dehydrohalogenation under subatmospheric pressures to facilitate distillation of the divinyl acetal from the reaction mixture. An alternative procedure is to separate the divinyl acetal after the dehydrohalogenation step has been completed.

The production of the new divinyl acetals of this invention is further illustrated by the following examples in which the parts are by weight.

*Example I*

The dehydrohalogenation of di(2-bromoethyl) formal by means of an alkali metal alcoholate to obtain divinyl formal is illustrated as follows: A solution of sodium tertiary amylate is made by heating and stirring 276 parts sodium and 1060 parts of tertiary amyl alcohol in 4000 parts of dry xylene in an atmosphere of dry oxygen-free nitrogen. To this solution contained in a 3-opening reactor vessel fitted with a short distilling column, a sealed mechanical stirrer, and a dropping funnel-adapter system allowing for ingress of nitrogen, and maintained at 110° C. by means of an external bath, is added 1570 parts of di(2-bromoethyl) formal over a period of 3 hours. The divinyl formal is distilled out of the reaction mixture as it is formed, and sodium bromide precipitates. The bath temperature is raised to 120–130° C. until the distillate ceased to decolorize bromine in carbon tetrachloride. From the reaction flask is obtained 1130 parts or a 92% yield of sodium bromide. Rectification of the crude distillate which contains divinyl formal along with xylene and tertiary amyl alcohol yields 400 parts (67% yield) of an unsaturated liquid boiling at 85.5 to 90.7° C. under atmospheric pressure. This material is divinyl formal contaminated with a small amount of tertiary amyl alcohol.

*Example II*

The dehydrohalogenation of di(2-haloethyl) formal by reaction with potassium hydroxide is conducted in the following manner:

To 350 parts of freshly fused and powdered potassium hydroxide contained in a 3-opening reactor vessel fitted with a mechanical stirrer and a distilling column leading to a receiver, dry ice-acetone trap, and calcium chloride tower, is added 305 parts of di(2-bromoethyl) formal. This mixture is heated slowly with good stirring to 170° C. and the distillate collected. Most of the distillate comes over during the first half-hour. The water layer is separated from the distillate and the divinyl formal is dried over anhydrous magnesium sulfate. Forty-three parts of divinyl formal boiling at 89–90° C. is obtained. This represents a yield of 40% of divinyl formal. Twenty parts of a mixture of di(2-bromoethyl) formal and vinyl 2-bromoethyl formal are also obtained.

Di(2-chloroethyl) formal by similar procedure is dehydrohalogenated to divinyl formal.

*Example III*

The dehydrochlorination of di(2-chloroethyl) butyral is carried out in the following manner:

To 908 parts of potassium hydroxide contained in a 3-opening reactor vessel, supported in a bath held at 220° C., fitted with a dropping funnel, a mechanical stirrer, and a 15 inch indented distilling column leading to an ice-cooled receiver, is slowly added 400 parts of di(2-chloroethyl) butyral. The divinyl butyral distills as it is formed. The distillate is washed with a 10% aqueous sodium bisulfite solution, dried over magnesium sulfate-potassium carbonate, and distilled. There is obtained 116 parts or a 43% yield of divinyl butyral boiling at 50–60° C. under 33 mm. and some vinyl 2-chloroethyl butyral. On redistillation the divinyl butyral boils at 57.8–58° C. under 32 mm.

Polymerization of the divinyl acetals alone or copolymerization with other polymerizable unsaturated compounds can be effected in bulk, in solution, by the granulation method, or by the emulsion technique. Heat or ultraviolet light are catalysts for the polymerization. Other catalysts such as peroxides, and polyvalent metal salts also accelerate the rate of polymerization when used alone or in conjunction with heat or light. Polymerization under the influence of light also proceeds rapidly when small amounts of diacetyl or benzoin are present in the monomer. Under the influence of such catalysts bulk polymerization of the divinyl acetals ultimately proceeds to a stage at which difficultly soluble or insoluble polymers are formed. However, by interrupting the polymerization prior to this stage soluble polymers can be obtained. The polymerization can be interrupted conveniently by precipitating the polymer from its solution in the monomer or other solvent by the addition of substances which are solvents for the monomer and non-solvents for the polymer. Petroleum ether and methanol are examples of substances suitable for separating the polymers of divinyl formal and divinyl butyral, respectively. The polymerization can also be interrupted by chilling the solution of polymer in monomer, and removing the latter under diminished pressure.

The following examples illustrate the several methods for polymerizing divinyl acetals.

*Example IV*

Four sealed Pyrex tubes, each containing 5 parts of divinyl formal are exposed at a temperature of 35° C. for 2, 4, 7, and 9 days at a distance of 15 inches from a quartz mercury arc. The two and four day polymers are cloudy gels; the seven day polymer is clear and tough, whereas the nine day polymer is clear and somewhat tougher. The latter polymer softens at 48° C. and has a hardness of 2 to 5 on the Moh scale. All the polymers are insoluble in chloroform, petroleum ether, and in the usual solvents.

*Example V*

A solution of 0.08 part of benzoyl peroxide in 90 parts of divinyl formal are heated at 80° C. When the solution becomes very viscous, e. g. 100 to 150 centipoises, which requires about 2 hours, the solution is poured into a chilled flask and the unreacted monomer is removed under nitrogen at 2 mm. The residue (58 parts of polymer) is dissolved in 298 parts of chloroform. Films flowed from the chloroform solution dry tack-free within a few hours and are clear, colorless, soft, but water-sensitive. After baking at 100° C. at 4 mm. for 24 hours, the films are clear, colorless, and are not whitened or softened after 72 hours soaking in water, 5% acetic acid, or in 1% caustic. They have good adherence to glass and a hardness of 4H. Baked films plasticized with dimethyl sebacate are exceptionally pliable. The films are not discolored after one month's exposure to ultraviolet light.

Example VI

Ten parts of divinyl formal dissolved in 15 parts of benzene containing 0.5 part of stannous chloride is allowed to stand for 96 hours at room temperature. The resultant viscous solution is washed with water, dried over anhydrous magnesium sulfate, and filtered. The filtrate containing the polymer is flowed out on a glass plate. The film obtained on evaporation of the solvent is colorless and moderately hard.

Example VII

An aluminum lined reaction vessel is charged with 20 parts of divinyl formal, 80 parts of isooctane and 0.4 part of benzoyl peroxide. The tube is pressured with ethylene to 600 atmospheres, and heating and agitation are applied. During a reaction time of 11.25 hours the temperature is maintained at 93–96° C. and the pressure at 635–960 atmospheres. During the first 4.25 hours, the total pressure drop amounts to 355 atmospheres. During the next 7 hours, the pressure drop is negligible. After cooling, the vessel is freed of unreacted ethylene, opened, and the reaction mixture discharged. The crude product amounts to 84 parts. A small amount of isooctane is filtered from the polymer, and the latter is dissolved in hot toluene and is precipitated by filtering into ethanol. The ethanol is cooled, filtered, the polymer is washed with methanol and dried at 70° C. There is thus obtained 20 parts of a white fluffy polymer. The polymer does not melt sharply, but on heating it softens and shows thermoplastic properties. The polymer can be molded to strong, flexible chips, or hot pressed to clear films. The polymer contains 78.72% carbon and 13.13% hydrogen from which it may be calculated that the molar ratio of ethylene to divinyl formal is 9.55:1.

Example VIII

An emulsion is prepared comprising butadiene (35 parts) and divinyl formal (15 parts) emulsified in an aqueous phase comprising 20 parts of 10% aqueous sodium oleate, 0.25 part of sodium hydroxide, 0.5 part ammonium persulfate, and 1.7 parts of a sulfonated naphthalene-formaldehyde condensation product, 40 parts of distilled water, and 5 parts of carbon tetrachloride. The emulsion is sealed in a tube and heated for 16 hours at 65° C. with constant agitation. To the resulting latex, after the tube is opened, is added 5 parts of a 25% aqueous dispersion comprising diphenylamine (45%) and N-phenyl-alpha-naphthylamine (55%) mixture. The reaction mixture is then coagulated with alcohol, whereupon a coherent, plastic rubber-like mass is obtained. The product is washed on the usual corrugated rubber mill with water until free of soap, and finally is brought to constant weight on a smooth rubber mill. The yield is 15 parts. The product is compounded in the manner of butadiene rubber, employing carbon black, softening agents, and dispersing agents. On curing, flexible, elastic, vulcanizates are obtained which show moderately good tensile strength and excellent resistance to "freezing" (i. e. the vulcanizates maintain elastic properties at very low temperatures). On the smooth mill the product shows better coherence and better tack than does butadiene polymer alone under the same conditions. It is also more plastic in its raw state than is butadiene polymer under the same conditions.

Example IX

Copolymers of divinyl formal with methyl methacrylate are obtained with 0.3 part benzoyl peroxide as catalyst by bulk polymerization of the mixture of monomers at 45° C. for 3 days. Copolymers in 100% yield are obtained with the divinyl formal in amounts ranging from 5 to 20 per cent of the two ingredients. The softening temperatures of the products rise with increasing methyl methacrylate content and vary for the proportions indicated from 60° to 83° C. Chips molded from these copolymers at 165° C. under 8000 lbs. for six minutes were clear and colorless.

Example X

Copolymers of divinyl formal with methyl methacrylate are also obtained by granular polymerization. The monomers are granulated in water (200 parts) by the addition of 14 parts of a granulating agent and stirring. The granulating agent is a partially hydrolized polyvinyl acetate dissolved in water. Approximately 0.5 to 1.0% of the agent (based on its dry weight) is added to the monomer-water mixture. Benzoyl peroxide in amount of 0.8 part by weight is added with vigorous stirring. The reaction mixture is maintained at 80° C. for 1 hour, after which the copolymer is filtered and washed with cold water. The copolymer is obtained in 91% yield with 90 parts of methyl methacrylate and 10 parts of divinyl formal, and in 85% yield with 80 parts of methyl methacrylate and 20% divinyl formal. Chips molded from these copolymers at 165° C. under 8000 lbs. for six minutes are clear and colorless.

Example XI

Vinyl acetate (80 parts) and divinyl formal (20 parts) are dispersed in water (600 parts) by the addition of 14 parts of a granulating agent and stirring. Benzoyl peroxide (2.0 parts) is added with vigorous stirring. The reaction is maintained at 80° C. for 1 hour, then filtered and washed with cold water. A 76% yield of a colorless copolymer that is deformable at 35° C. is obtained.

Example XII

Divinyl butyral (10 parts) is exposed to ultraviolet light at 35–40° C. After 7 days the resulting monomer-polymer mixture is a thick, clear, viscous mass. The polymer is soluble in chloroform, and from such a solution a white plastic mass (6 parts) is precipitated by the addition of methanol.

When the polymerization is effected in ultraviolet light in the presence of 0.2% of diacetyl as a catalyst, a somewhat rubbery, clear, soft, chloroform-insoluble polymer is obtained within 4 days. Polymerization in glass containers of different surface areas shows that the rate of polymerization becomes greater as the effective surface area exposed increases.

A 43% solution of the chloroform-soluble polymer in chloroform is perfectly clear and fairly light-bodied (Gardner-Holt: 2.7 poises). The polymer has an average molecular weight of 2100. Films of the polymer flowed on glass plates are somewhat tacky after a week's air drying. After baking at 100° C. for 72 hours the films are tough and hard and adhere strongly to glass.

Example XIII

To a solution of divinyl butyral (1 part) in petroleum ether (4 parts) is added bismuth chloride (.01 part). Within 9 days at room temperature a soft yellow gel soluble in chloroform and in methanol is obtained.

To a solution of divinyl butyral (1 part) in petroleum ether (4 parts) chilled to —10° C. is added a drop of boron trifluoride-ether complex. A precipitate of yellow, flocculent, opaque polymer is obtained which is infusible and insoluble in common organic solvents.

*Example XIV*

Mixtures of divinyl butyral and methyl methacrylate, along with one per cent by weight peroxide catalyst are heated at 70° C. for 48 hours. Clear, colorless polymers soluble in chloroform are obtained. The copolymers obtained from 90 parts methyl methacrylate and 10 parts divinyl butyral has a softening point of 95° C. and a hardness of 305 grams, and that obtained from 80 parts methyl methacrylate and 20 parts divinyl butyral had a softening point of 70° C. and a hardness of 370 grams. The hardness is determined with an instrument that measures the weight required to force a quartz ball of 0.25 inch diameter to a given depth in the surface of the polymer.

*Example XV*

A mixture of 10 parts divinyl butyral, 90 parts vinyl acetate and one part benzoyl peroxide is exposed to ultraviolet light at 35° C. for 28 hours. The resulting copolymer is a hard, clear resin which softens at 53° C. A copolymer of similar properties softening at 55° C. is similarly obtained from 20 parts divinyl butyral and 80 parts vinyl acetate.

*Example XVI*

An aluminum lined sealed reaction bomb is charged with 20 parts of divinyl butyral, 80 parts of isooctane, and 0.4 part of benzoyl peroxide. The tube is closed, placed in an agitating rack and pressured with ethylene to 600 atmospheres. During a reaction time of about 10 hours, the temperature is maintained at 85–86° C. and the pressure at 855–965 atmospheres. During the first half of the reaction time the total pressure drop is 195 atmospheres. During the second half there is no further drop in pressure. On washing up the product there is obtained 7.3 parts of polymer which melts at about 100° C. and is soluble in isooctane.

The divinyl acetals of this invention may be derived from any of the aldehydes known to be useful in acetal formation. The preferred aldehydes are formaldehyde and aliphatic aldehydes containing not more than seven carbon atoms and having hydrogen attached to the carbon alpha to the carbonyl. Examples of these aldehydes are formaldehyde, acetaldehyde, propionaldehyde, butyraldehyde, isobutyraldehyde, n-pentaldehyde, 2-methyl butyraldehyde, tetrahydrofurfural, n-hexaldehyde, 2,3-dimethyl butyraldehyde, 4-methyl pentaldehyde, n-heptaldehyde, 3,4-dimethyl pentaldehyde, 3-ethyl pentaldehyde, 3-methyl hexaldehyde, ethoxy acetaldehyde ($C_2H_5OCH_2CHO$), benzaldehyde, and p-methoxy benzaldehyde.

The dehydrohalogenation reaction can be conducted in several ways. These methods include reaction with alkali dissolved in alcohols, reaction with alkali metal alcoholates, reaction with fused alkali, reaction at elevated temperatures with pulverized alkali either suspended in inert organic liquids or alone, and reaction at elevated temperatures with alkali metal oxides, e. g. sodium oxide, or alkaline metal oxides, e. g. lime, either alone or suspended in inert organic liquids. Tertiary amines such as pyridine and quinoline can also be used for dehydrohalogenation. Quinoline at elevated temperatures is very effective. Some dehydrohalogenation occurs at temperatures as low as 70° C., but the rate of reaction is rather slow and temperatures of at least 100° C. are recommended. The temperature selected is determined to some extent by the boiling point of the resulting divinyl acetal, since the acetal as soon as it is formed is preferably distilled from the reaction vessel and collected in an externally cooled receiver. The dehydrohalogenation can, however, be effected in a sealed autoclave and the products separated and distilled when the reaction is complete.

The polymers of divinyl acetals, when allowed to attain high molecular weights, are insoluble, infusible, rubbery gels. Accordingly, when soluble polymers are desired, the polymerization must be interrupted and terminated before insolubilization occurs. The formation of insoluble polymers is believed to be due to the formation of a cross-linked or three-dimensional polymer, since the divinyl acetals contain two vinyl groups which can participate in the polymerization. The presence of two vinyl groups in the divinyl acetals makes them useful cross linking agents for other polymers. Thus some degree of cross linking can be obtained by interpolymerizing a monovinyl compound and a divinyl acetal.

Examples of useful polymerization catalysts not previously mentioned are ferric chloride, aluminum chloride, phosphorous trifluoride, phosphorous pentafluoride, antimony trichloride, antimony pentabromide, bismuth chloride, zinc chloride, benzoin, iodine, uranyl acetate (with light), acetyl peroxide, hydrogen peroxide, triethyl lead chloride, persulfate salts, hydrogen fluoride, ozone, and activated hydrosilicates such as floridin.

In the granulation method of polymerization or copolymerization the monomer is dispersed in water in the form of fine droplets by first adding a granulating agent, such as partially hydrolyzed polyvinyl alcohol, and rapidly stirring the monomer-water mixture. Small amounts of benzoyl peroxide are added and the temperature is raised to and maintained near 80° C. until polymerization is complete. In emulsion polymerizations and copolymerizations the known emulsifying agents and soaps can be used. Polymerization catalysts such as ammonium persulfate or benzoyl peroxide can be added to the emulsion. Polymerization is preferably effected by sealing the emulsion in a reaction container with a very small amount of oxygen and heating for several hours with constant agitation at a temperature of 50–100° C. Polymers and copolymers can be prepared in solution at atmospheric pressure or at increased pressures. Inert organic liquids that are solvents for the monomers, but not necessarily solvents for the polymers, can be used for solution polymerziation. These are illustrated by, but not limited to, isooctane, benzene, toluene, naphtha, petroleum ether, diethyl ether, and diisopropyl ether.

In the preparation of copolymers the selection of the particular polymerizable compound and the ingredient proportions are determined by the properties desired for the resulting copolymer. Proportions of from 1% to 99% of divinyl acetal in the copolymer are obtainable by the known methods of vinyl polymerization. Examples of compounds suitable for copolymerization with divinyl acetals include ethylene, vinyl chloride, vinyl bromide, vinyl acetate, vinyl formate, methyl vinyl ketone, methyl acrylate, acrylonitrile, methacrylonitrile, methyl methacrylate, methoxyethyl methacrylate, ethoxyethyl methacrylate, diethyl fumarate, maleic anhydride, styrene, unsymmetrical dichloroethylene, isobutylene, butadiene, β-alkoxybutadiene, divinyl ether, chloroprene, bromoprene, cyanoprene, and drying oils. When copolymerization is carried out either in bulk or in solution in an anhydrous solvent, in addition to the vinyl compounds named acrylic acid, alpha-chloracrylic acid, and methacrylic acid can also be copolymerized with divinyl acetals. It is also possible to interpolymerize two or more different divinyl acetals.

The polymers and copolymers of this invention can be hydrolyzed or partially hydrolyzed, e. g. by means of acid, to give products analogous to polyvinyl alcohol. These products are water sensitive and can be used as substitutes for polyvinyl alcohol. It is also possible to react the hydrolyzed products with compounds which react with hydroxyl groups, e. g., acids, to form new polymers.

Interpolymers derived from olefines and divinyl acetals in which both vinyl groups of the acetal take part in the polymerization yield glycols on hydrolysis. The higher the ratio of olefine to divinyl acetal in the interpolymer the longer the average chain length of the glycols will be.

Certain of the polymers and copolymers herein described can be prepared in bulk in containers of any shape to give castings having the shape of the container. They may be shaped or formed by sawing, drilling, filing, turning, etc. The present polymers and copolymers are useful for the preparation of plastics, coatings, films, and adhesives. For any of these purposes, the polymers or copolymers can be combined with or prepared in the presence of plasticizers, stabilizers, fillers, pigments, dyes, softeners, proteins, cellulose derivatives, oils, rubber, rubber substitutes, natural resins, or other synthetic resins. These compositions are useful for impregnating materials such as textiles, leather, metals, glass, paper, stone, brick, concrete, plaster, and the like.

As many apparently widely different embodiments of this invention may be made without departing from the spirit and scope thereof, it is to be understood that I do not limit myself to the specific embodiments thereof except as defined in the appended claim.

I claim:

A copolymer of divinyl formal and vinyl acetate which has a softening temperature of about 35° C. and which is the copolymerization product of 20 parts by weight of divinyl formal and 80 parts by weight of vinyl acetate.

DONALD DRAKE COFFMAN.